(12) United States Patent
Tanaka (10) Patent No.: US 6,587,973 B1
(45) Date of Patent: Jul. 1, 2003

(54) METHOD AND APPARATUS FOR IMPLEMENTING FAULT TOLERANT LOGIC IN A STORAGE SYSTEM

(75) Inventor: Akio Tanaka, Alta, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/510,705

(22) Filed: Feb. 22, 2000

(51) Int. Cl.[7] .............................. H02H 3/05; G11B 5/09
(52) U.S. Cl. ............................. 714/54; 714/42; 714/53; 360/48; 360/78.08
(58) Field of Search ........................ 714/42, 53, 54; 360/48, 78.08

(56) References Cited

U.S. PATENT DOCUMENTS

| | | | | |
|---|---|---|---|---|
| 3,619,585 A | * | 11/1971 | Edmondson | 365/201 |
| 4,208,650 A | * | 6/1980 | Horn | 375/369 |
| 5,172,381 A | * | 12/1992 | Karp et al. | 360/48 |
| 6,347,017 B1 | * | 2/2002 | Carlson | 360/77.04 |
| 6,374,381 B1 | * | 4/2002 | Moriya | 714/746 |
| 6,421,805 B1 | * | 7/2002 | McAuliffe | 714/756 |

* cited by examiner

Primary Examiner—Robert Beausoliel
Assistant Examiner—Emerson Puente
(74) Attorney, Agent, or Firm—John F. Schipper (57) ABSTRACT

A mechanism for implementing fault tolerant logic in an information storage system is disclosed. The mechanism comprises an inhibit logic which is invoked when the first RUNOUT block of a link sequence is detected. Once invoked, the inhibit logic outputs a disable signal, and so long as the disable signal is asserted, certain control signals are inhibited. These control signals may include a trigger signal, a target match signal, and a miss signal. The disable signal is maintained during the reading of blocks, such as link sequence blocks, in which information corruption is most likely to occur. By doing so, the inhibit logic prevents erroneous signals generated as a result of corrupted information from adversely affecting the operation of the storage system. As a result, the corrupted information is tolerated.

17 Claims, 5 Drawing Sheets

METHOD AND APPARATUS FOR IMPLEMENTING FAULT TOLERANT LOGIC IN A STORAGE SYSTEM

FIELD OF THE INVENTION

This invention relates generally to storage systems and more particularly to a method and apparatus for implementing fault tolerant logic in a storage system.

BACKGROUND OF THE INVENTION

Traditionally, mass storage systems have been based upon magnetic media, such as floppy disks, hard drives, and tapes. In recent years, however, because of their high storage capacities, optical media have also been used effectively for mass storage purposes. Optical media include CD-ROM's (compact disk-read only memory), recordable CD's, and re-writable CD's. Typically, information is written onto an optical medium by imposing marks and spaces or pits and lands onto the medium. These are later detected by a reading mechanism to extract information from the optical medium.

Figure 1:
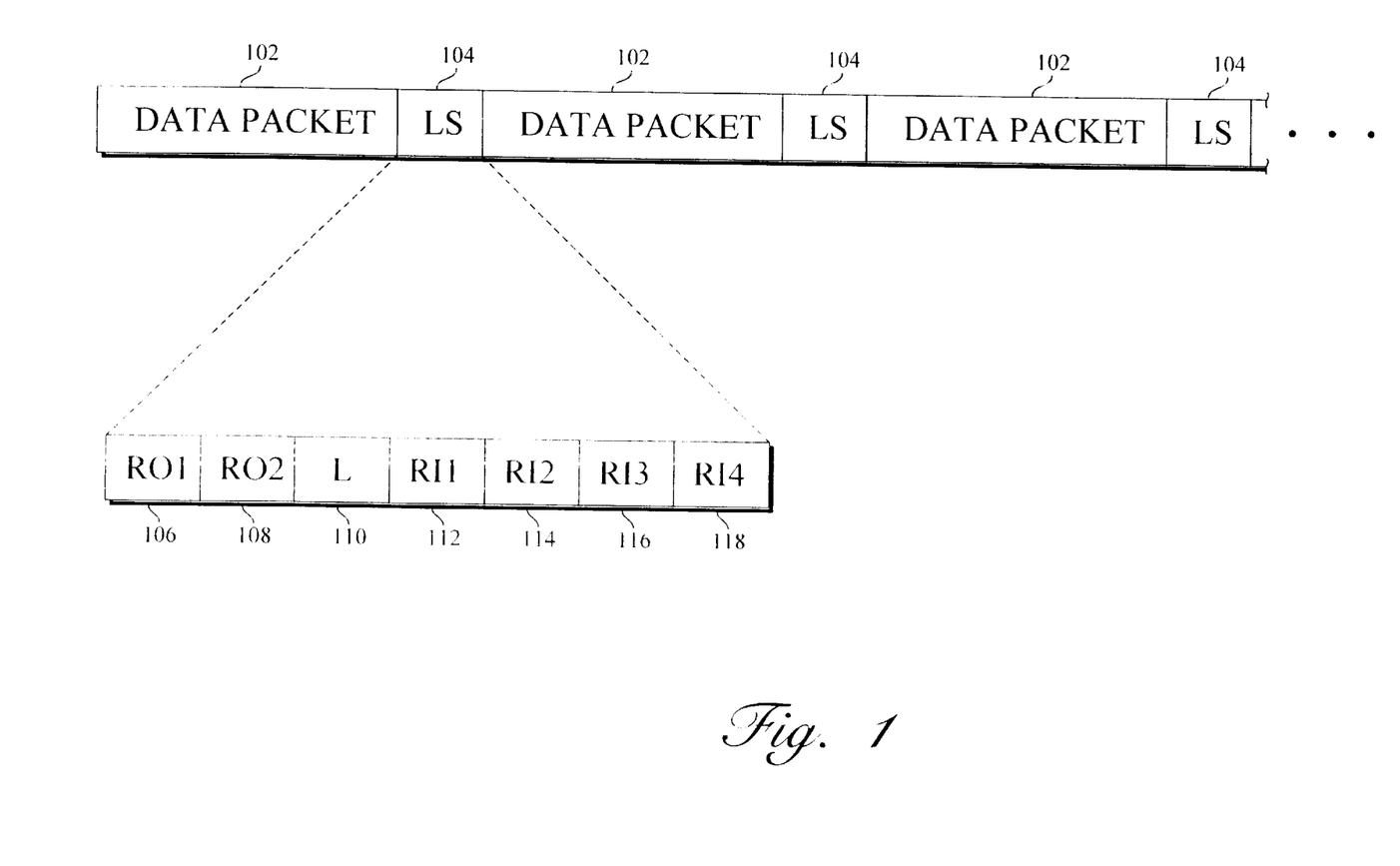
FIG. 1 is a logical diagram illustrating a typical manner in which packets of information are stored on a storage medium.

Typically, information is written onto a CD in the form of packets. Each packet usually comprises a certain number of data blocks, and each packet is separated from other packets by a link sequence. A typical packet arrangement is shown in FIG. 1, wherein a plurality of packets 102 are shown with link sequences 104 imposed therebetween. The link sequences 104 provide distinct separations between the data packets 102, which makes management of data on the CD much simpler.

As shown, a typical link sequence 104 comprises a series of seven blocks. These blocks include two RUNOUT blocks 106, 108, one link block 110, and four RUNIN blocks 112–118. The RUNOUT blocks 106, 108 signal the end of the previous packet, the RUNIN blocks 112–118 signal the beginning of the next packet, and the link block 110 provides the transition between the RUNOUT blocks 106, 108 and the RUNIN blocks 112–118. One of the main purposes of the link sequence blocks 106–118 is to provide sufficient "padding" to enable the writing mechanism to start and to stop gracefully.

More specifically, when writing information onto a CD, it is often necessary to stop the writing mechanism after writing a certain packet, and then to restart the writing mechanism to write the next packet. This is especially true in recordable and rewritable CD systems. The link sequence blocks 106–118 are designed to accommodate this. Specifically, when the writing mechanism is writing the last packet of a file, it: (1) writes the last data packet; (2) writes the two RUNOUT blocks 106, 108; (3) writes a portion of the link block 110; and (4) then stops gracefully. When it comes time to write the next data packet, the writing mechanism: (1) starts gracefully; (2) completes writing the link block 110; (3) writes the RUNIN blocks 112–118; and (4) then writes the next data packet.

Ideally, in writing the link sequence blocks 106–118, the writing mechanism maintains the integrity of the blocks 106–118. Unfortunately, due to shortcomings in the current technology, it has been found that the writing mechanism often corrupts the information in some of the link sequence blocks, particularly, the second RUNOUT block 108, the link block 110, and the first two RUNIN blocks 112, 114. If this corruption occurs in the data portion of the link sequence blocks, not much harm is done since the link sequence blocks do not contain actual valid data. However, if the corruption occurs in the header portion of the link sequence blocks, serious errors may result. This is because the header contains important information (such as the type of the block and the address of the block) that is used in accessing and processing information on the CD. If errors are introduced into the headers of the link sequence blocks, the integrity of the stored data may be compromised.

Various errors may result from header corruption, but three of the most serious potential errors are: (1) false triggering; (2) false target matching; and (3) false target missing. A false triggering error may occur if the header of more than one link sequence block 106–118 in a link sequence indicates that it is the first RUNOUT block 106. For example, if the header of the second RUNIN block 114 is corrupted so that it indicates that it is the first RUNOUT block 106, a false triggering error will occur. A false triggering error may cause one or more data blocks to be mistakenly treated as a link sequence block.

To elaborate, whenever a header indicating a first RUNOUT block 106 of a link sequence is detected, a trigger signal is issued which informs a processing mechanism that the next seven blocks will be link sequence blocks. In response to this signal, the processing mechanism treats the next seven blocks as link sequence blocks. If this header is detected in an actual first RUNOUT block 106, then processing of the next seven blocks will be proper. However, if this header appears in a block other than a first RUNOUT block 106, then subsequent data blocks may be treated as link sequence blocks, a very undesirable result. For example, if the header of the second RUNIN block 114 is corrupted so that it indicates that it is the first RUNOUT block 106, it will cause the trigger signal to be issued, which in turn will cause the RUNIN blocks 114, 116, 118 and the following four data blocks of the next data packet to be treated as link sequence blocks. Treating data blocks as link sequence blocks causes data to be lost, as well as other problems. Thus, false triggering is a serious problem.

Another potentially serious problem is that of false target matching. As mentioned previously, the header of a block includes the address of the block on the storage medium. This address is unique to each block, and is used to identify and to locate each block. If the address of a block is corrupted so that it becomes the same as that of another block, it may lead to the issuance of an erroneous target match signal. For example, if a target data block has an address X, and if the header of RUNIN block 114 is corrupted so that its address indicates that it is at address X, then an attempt to find the target data block may result in locating RUNIN block 114 instead. This can lead to serious data errors.

A third and related potential problem is that of false target missing. Typically, when searching for a target block, if a certain number (e.g. three) of blocks have been encountered having location values greater than that of the target block, a target miss signal is asserted. This signal informs a controller that it has gone past the target block, and causes the controller to try again. If a sufficient number of link sequence blocks are corrupted in a particular manner, false target misses may occur. For example, if blocks 108, 110, and 112 have all been corrupted such that their location values are greater than a subsequent data block, they will cause a false target miss to occur each time the reading mechanism tries to read the subsequent data block. If that is the case, then the subsequent data block is in effect rendered inaccessible. This can cause substantial portions of a storage medium to be rendered useless.

As the above discussion shows, the information corruption caused by limitations in the current writing technology can lead to serious errors. As a result, a fault tolerant mechanism is needed to compensate for the information corruption.

SUMMARY OF THE INVENTION

The present invention provides an improved mechanism for implementing fault tolerant logic in an information storage system, which enables information corruption to be tolerated to a certain extent. The present invention is based, at least partially, upon the observation that a vast majority of the information corruption happens within certain link sequence blocks. That being the case, certain control signals may be inhibited during the reading of these blocks to prevent the control signals from being manifested to a processing mechanism. By doing so, the present invention prevents erroneous signals caused by information corruption from adversely affecting the operation of the system. As a result, the present invention makes it possible to tolerate the information corruption.

In light of this observation, the present invention provides an information processing mechanism comprising a control signal inhibit logic. In one embodiment, this inhibit logic is invoked when the first RUNOUT block of a link sequence is detected, and once invoked, it provides a disable signal. So long as the disable signal is asserted, certain control signals are inhibited. In one embodiment, these control signals include the trigger signal, the target match signal, and the target miss signal. The disable signal is maintained during the reading of the blocks in which information corruption is most likely to occur, and in one embodiment, this is during the reading of the link sequence blocks. By doing so, the inhibit logic prevents erroneous signals caused by information corruption from adversely affecting the operation of the system. As a result, the information corruption is tolerated.

DETAILED DESCRIPTION OF THE EMBODIMENTS

Figure 2:
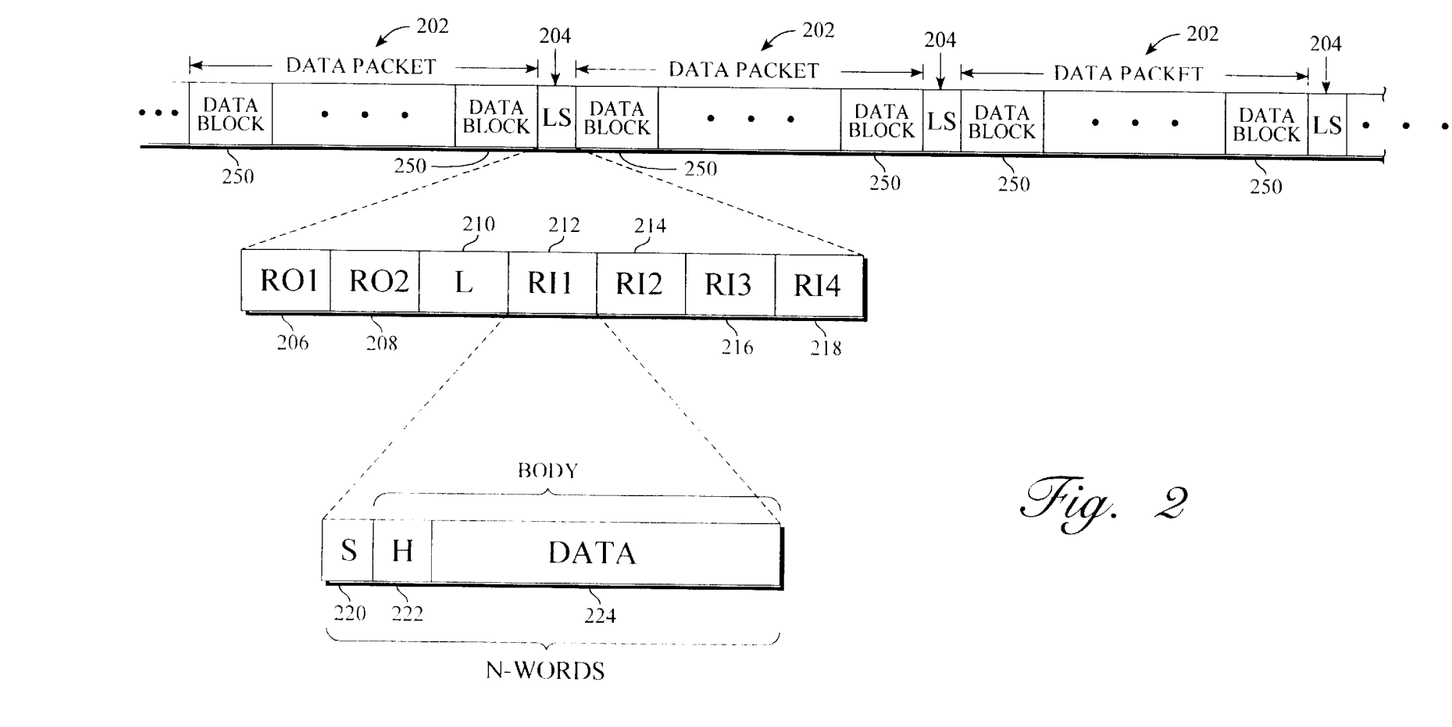
FIG. 2 is a logical diagram illustrating the manner in which information is stored on a storage medium in accordance with one embodiment of the present invention.

With reference to FIG. 2, there is shown one possible arrangement for storing information onto a storage medium in accordance with one embodiment of the present invention. As shown, information is stored on the storage medium in the form of data packets 202, with each data packet 202 being separated from other data packets 202 by link sequences LS 204. The link sequences 204 provide distinct separations between the data packets 202 to make management of access to the packets 202 much simpler. In one embodiment, each data packet 202 comprises thirty two data blocks 250; however, it should be noted that for purposes of the present invention, a data packet 202 may comprise any number of data blocks 250.

In one embodiment, each link sequence 204 comprises a series of seven link sequence blocks 206–218. As shown, these blocks include two RUNOUT blocks 206, 208, one link block 210, and four RUNIN blocks 212–218. The RUNOUT blocks 206, 208 signal the end of the previous data packet 202, the RUNIN blocks 212–218 signal the beginning of the next data packet 202, and the link block 210 provides the transition between the RUNOUT blocks 206, 208 and the RUNIN blocks 212–218. One of the main purposes of the link sequence blocks 206–218 is to provide sufficient "padding" to enable the writing and reading mechanisms to start and to stop gracefully.

According to one embodiment, each block, whether it be a data block 250 or a link sequence block 206–218, has the format shown in FIG. 2 for RUNIN block RI1 212. Specifically, at the beginning of each block, there is a SYNCH portion 220. This SYNCH portion 220 indicates the beginning of a new block, and hence, acts as the herald of a block.

Following the SYNCH portion 220 is a header portion 222 which provides information specific to that particular block. This information includes the address of the block on the storage medium. Where the storage medium is a CD, for example, the address information may be expressed in terms of minutes, seconds, and block number, which specify how far into the CD, in terms of time, the block resides. The header information also specifies the type of the block, i.e. whether it is a data block 250, a RUNOUT1 block RO1 206, a RUNOUT2 block RO2 208, a link block L 210, a RUNIN1 block RI1 212, a RUNIN2 block RI2, a RUNIN3 block RI3 216, or a RUNIN4 block RI4 218. As will be discussed further below, this header information is used to access and to process a particular block.

Following the header portion 222 is the data portion 224 of the block. For a data block 250, this portion 224 will contain actual data. For a link sequence block 206–218, this portion 224 will contain some arbitrary pattern of 1's and 0's, such as all 1's, all 0's, or an arbitrary combination thereof. Since the link sequence blocks 206–218 are mainly used for "padding", they do not contain any actual data. Together, the SYNCH portion 220, the header portion 222, and the data portion 224 have a combined size of N-words, where a word may be any size, ranging from one byte to multiple bytes. For purposes of the present invention, N may be set to any desired number.

Ideally, in writing the link sequence blocks 206–218 onto a storage medium, a writing mechanism maintains the integrity of the link sequence blocks 206–218. Unfortunately, due to shortcomings in the current technology, it has been found that the writing mechanism often corrupts the information in some of the link sequence blocks, particularly, the RUNOUT2 block RO2 208, the link block L 110, the RUNIN1 block RI1 112, and the RUNIN2 block RI2 114. If this corruption occurs in the data portions 224 of these blocks 208–214, not much harm is done since these blocks do not contain actual valid data. However, if the corruption occurs in the header portions 222, serious errors may result since the headers 222 contain important information used in accessing and processing information on the storage medium. Currently, it is not possible to prevent the information in these blocks 208–214 from being corrupted; thus, the alternative is to develop a fault tolerant mechanism which enables proper operation even in the face of the corruption. The present invention provides such a mechanism.

Figure 3:
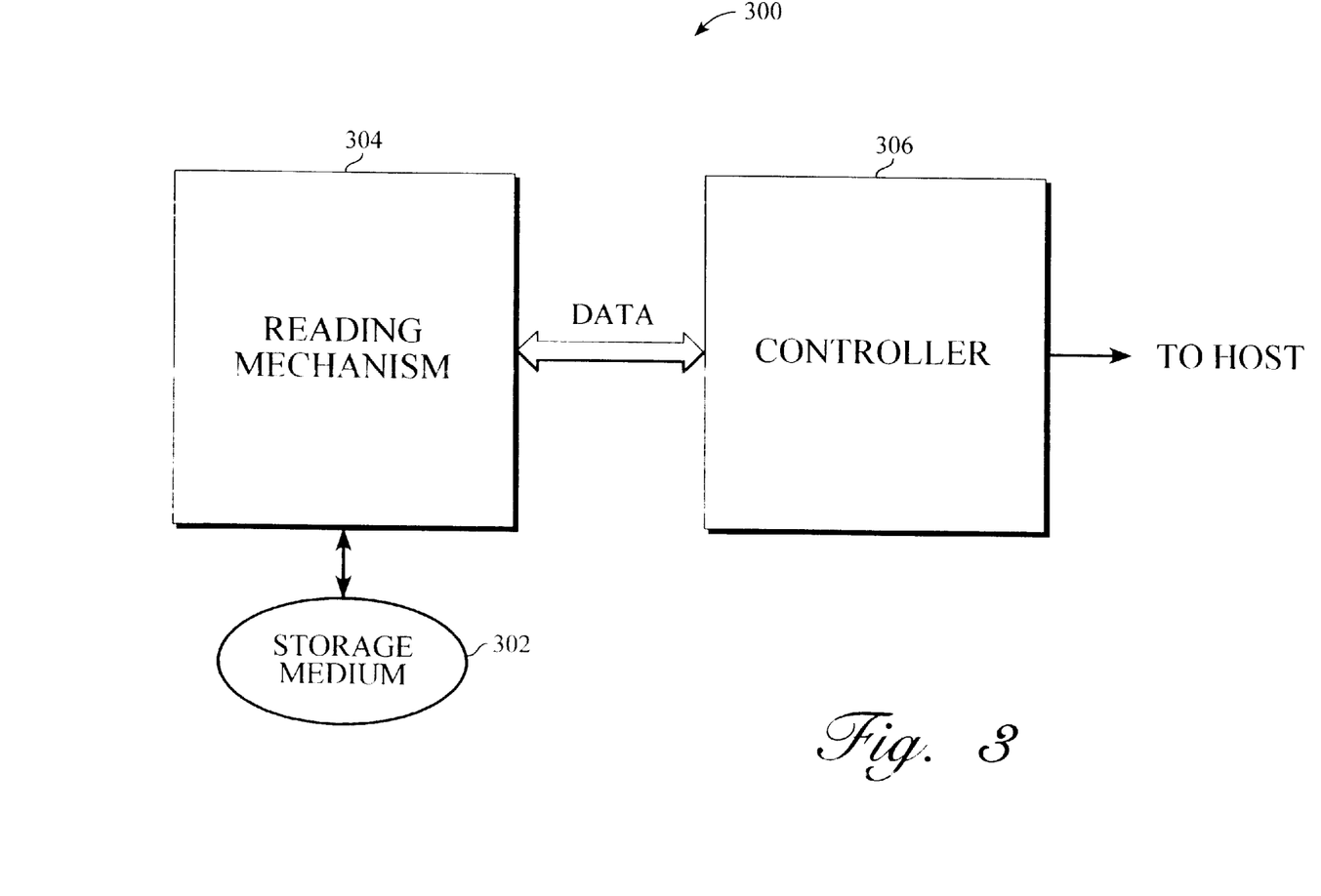
FIG. 3 is a block diagram of a system in which the present invention may be implemented.

With reference to FIG. 3, there is shown a block diagram of a storage system 300 in which the present invention may be implemented. The storage system 300 first comprises a storage medium 302 for storing information, data, computer instructions, etc. For purposes of the present invention, the storage medium 302 may take the form of any medium capable of storing digital and/or analog signals, including but not limited to an optical medium (e.g. CD-ROM, recordable CD, rewritable CD, etc.), a magnetic medium (e.g. floppy disk, hard disk, tape, etc.), and a memory (e.g. RAM, ROM, PROM, flash memory, etc.).

System 300 further comprises a reading mechanism 304 for extracting information from the storage medium 302. The form of the reading mechanism 304 will depend upon the form of the storage medium 302. For example, if the storage medium 302 is a CD or a DVD, then the reading mechanism 304 may comprise a laser, a mechanism for positioning the laser, and a detection mechanism. On the other hand, if the storage medium 302 is a magnetic disk, then the reading mechanism 304 may comprise a magnetic head and a motor for positioning the head onto various portions of the disk. These and other forms are possible for the reading mechanism 304.

The storage system 300 further comprises a controller 306 for controlling the overall operation of the system 300. Specifically, among other functions, the controller 306: (1) controls what information is read from the storage medium 302 by the reading mechanism 304; and (2) controls how that information is processed prior to being passed on to a host. In one embodiment, it is the controller 306 that implements the methodology of the present invention.

Figure 4:
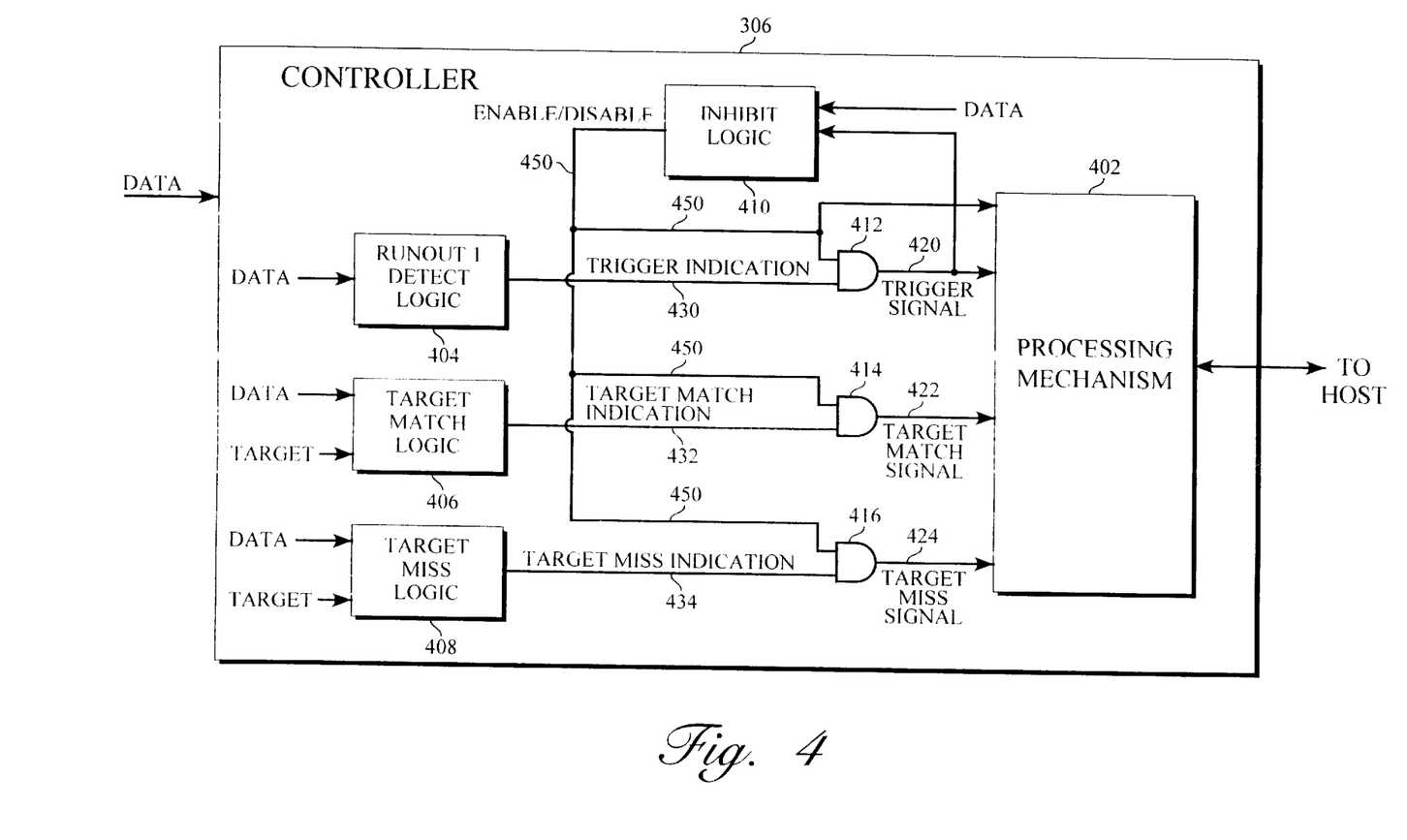
FIG. 4 is a block diagram of a controller in accordance with one embodiment of the present invention.

With reference to FIG. 4, there is shown one possible embodiment of the controller 306 in accordance with the present invention. As shown, the controller 306 first comprises a processing mechanism 402 for controlling the overall operation of the controller 402. The processing mechanism 402 interfaces with a host to determine what information needs to be read from the storage medium 302 (FIG. 3). The processing mechanism 402 also controls the manner in which the information is read, and the manner in which the information, once read, is processed. In one embodiment, the processing mechanism 402 is implemented in firmware.

In carrying out its control function, the processing mechanism 402 receives a plurality of control signals, including the trigger signal 420, the target match signal 422, and the target miss signal 424. In response to these control signals 420–424, the processing mechanism 402 processes the information read from the storage medium 302 accordingly. More specifically, the trigger signal 420 informs the processing mechanism 402 that, beginning with the present block, the next several blocks (in the embodiment shown in FIG. 2, the next seven blocks) will be link sequence blocks. Thus, the processing mechanism 402 processes the next several blocks as non-data, link sequence blocks. Similarly, the target match signal 422 informs the processing mechanism 402 that a target block has been located on the storage medium 302. In response, the processing mechanism 402 causes the target block to be read, processes the target block, and passes the target block on to the host. The target miss signal 424 informs the processing mechanism 402 that a target block on the storage medium 302 has been missed. In response, the processing mechanism 402 causes the reading mechanism 304 to go back to a previous location on the storage medium 302, and to search for the target block again. As this discussion shows, the control signals 420–424 determine in large part the behavior of the processing mechanism 402.

In addition to the processing mechanism 402, the controller 306 further comprises a RUNOUT1 detect logic 404, a target match logic 406, and a target miss logic 408. The RUNOUT1 detect logic 404 receives as input data read from the storage medium 302, and provides as output a trigger indication signal 430. The main function of the detect logic 404 is to determine, based upon the header of each incoming block, whether the block is a RUNOUT1 block RO1 206 (i.e. is the first block of a link sequence). If the incoming block is a RUNOUT1 block RO1 206, then the detect logic 430 asserts the trigger indication signal 430. On the other hand, if the data block is not a RUNOUT1 block RO1 206, then the detect logic 430 deasserts the trigger indication signal 430. As will be discussed later, an asserted trigger indication signal 430 may or may not be manifested to the processing mechanism 402 as the trigger signal 420.

The target match logic 406 receives two inputs: (1) the data read from the storage medium 302; and (2) the address of a target block provided by the processing mechanism 402. As output, the target match logic 406 provides a target match indication signal 432. The main function of the target match logic 406 is to extract from the header of each incoming block the address information for that block, and to compare that address with the address of the target block. If the addresses are equivalent, then the target match logic 406 asserts the target match indication signal 432. However, if the locations are not equivalent, then the target match logic 406 deasserts the target match indication signal 432. As will be discussed later, an asserted target match indication signal 432 may or may not be manifested to the processing mechanism 402 as the target match signal 422.

Like the target match logic 406, the target miss logic 408 also receives two inputs: (1) the data read from the storage medium 302; and (2) the address of a target block provided by the processing mechanism 402. As output, the target miss logic 408 provides a target miss indication signal 434. The main function of the target miss logic 408 is to determine whether the reading mechanism 304 has gone past the target block on the storage medium 302. In carrying out this function, the target miss logic 408 extracts from the header of each incoming block the address for that block, and compares that address with the address of the target block. If the address of the header is greater than the address of the target block, the target miss logic 408 makes a note of the fact. If a certain number (e.g. three) of incoming blocks have had location values greater than the location value of the target block, then the target miss logic 408 asserts the target miss indication signal 434. Otherwise, the target miss logic 408 deasserts the target miss indication signal 434. As will be discussed later, an asserted target miss indication signal 434 may or may not be manifested to the processing mechanism 402 as the target miss signal 424.

Whether asserted or deasserted, the indication signals 430, 432, 434 from the logics 404, 406, 408 are fed as inputs to separate AND gates. Specifically, the trigger indication signal 430 is fed as an input to AND gate 412, the target match indication signal 432 is fed as an input to AND gate 414, and the target miss indication signal 434 is fed as an input to AND gate 416. Also fed as input to the AND gates 412, 414, 416 is the enable/disable signal 450 from the inhibit logic 410. If the enable/disable signal 450 is high (i.e. enabled), then the indication signals 430, 432, 434, if asserted, are manifested to the processing mechanism 402 as the control signals 420, 422, 424, respectively. However, if the enable/disable signal 450 is low (i.e. disabled), then regardless of the status of the indication signals 430, 432, 434, none of the control signals 420, 422, 424 will be asserted. Thus, the enable/disable signal 450 can be used as a signal inhibitor to prevent the control signals 420, 422, 424 from being manifested to the processing mechanism 402.

In one embodiment, the enable/disable signal 450 is kept low (in the disabled state) during the reading of blocks in which information corruption is most likely. By doing so, the present invention inhibits the control signals 420, 422, 424 during the reading of these blocks, and hence, prevents potentially corrupt information in such blocks from causing the assertion of erroneous control signals. This in turn prevents the corrupt information from adversely affecting the operation of the processing mechanism 402. As a result, the present invention makes it possible to maintain proper operation even in the face of corrupt information, including corrupt header information. In effect, the corrupt information is successfully tolerated.

Figure 5:
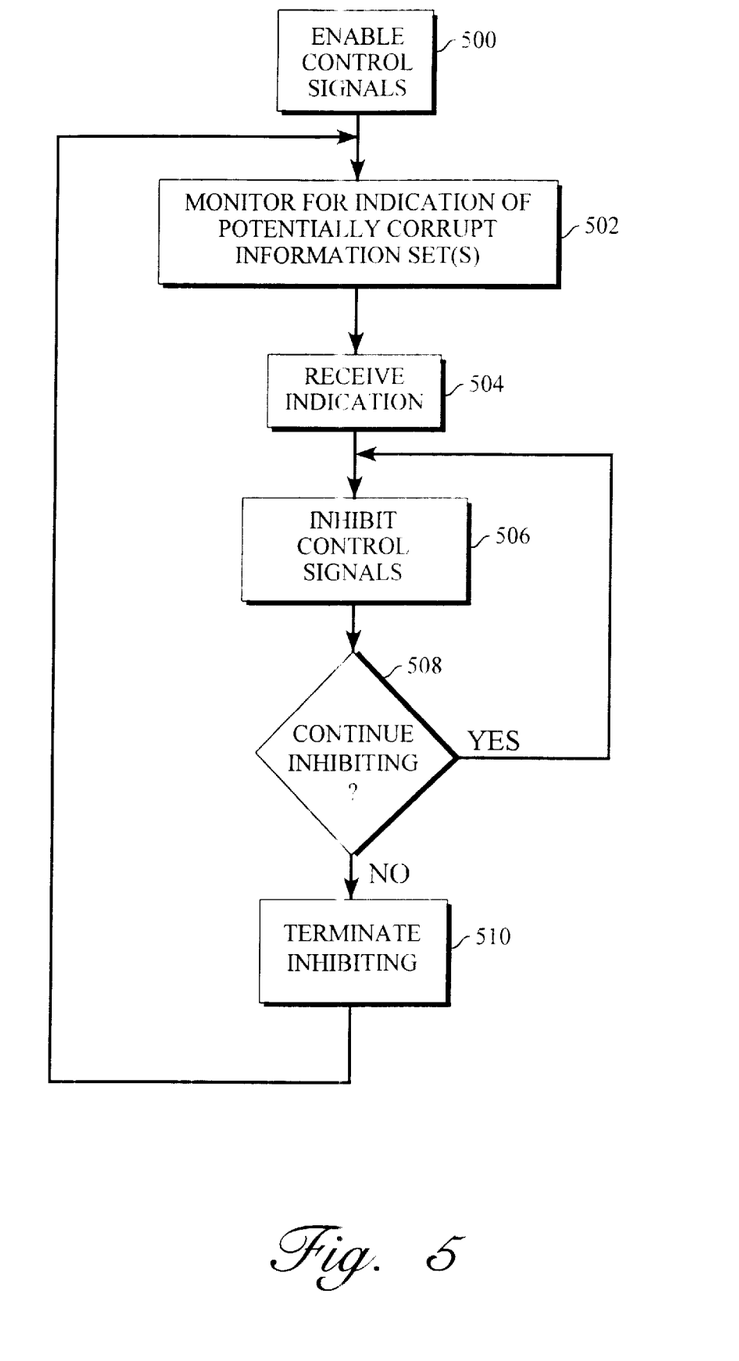
FIG. 5 is an operational flow diagram for a control signal inhibit logic in accordance with one embodiment of the present invention.

The state of the enable/disable signal 450 is controlled by the inhibit logic 410. FIG. 5 shows an operational flow diagram for the inhibit logic 410, and in one embodiment, the inhibit logic 410 is implemented using hardwired logic components to maximize processing speed. As shown in FIG. 5, the inhibit logic 410 operates by initially enabling (500) the control signals 420, 422, 424. In one embodiment, this is done by setting and maintaining the enable/disable signal 450 at a high state (i.e. enabled). Thus, during normal operation, indication signals 430, 432, 434, if asserted, are manifested as control signals 420, 422, 424, respectively, to the processing mechanism 402.

Once the control signals are initially enabled, the inhibit logic 410 monitors (502) for an indication that one or more upcoming blocks are blocks likely to contain corrupted information. In one embodiment, this indication is the trigger signal 420 which signals the beginning of a link sequence. As noted previously, it has been found that most of the information corruption occurs within the link sequence blocks 206–218 (FIG. 2), and particularly within RUNOUT block RO2 208, link block L 210, RUNIN block RI1 212, and RUNIN block RI2 214. Since the trigger signal 420, when asserted, indicates the beginning of a link sequence, it is a good herald of potentially corrupted blocks. Once the indication of potentially corrupted blocks is detected, it is received (504) by the inhibit logic 410.

In response, the inhibit logic inhibits (506) the control signals 420, 422, 424. In one embodiment, this is achieved by setting and maintaining the enable/disable signal 450 at a low state (thereby, asserting the disable signal). So long as the enable/disable signal 450 is maintained low, all of the control signals 420, 422, 424 are inhibited, so that even if corrupt information causes a false trigger indication, a false target match indication, or a false target miss indication to occur, no harm is done. These false indications are not manifested to the processing mechanism 402. Thus, the processing mechanism 402 is shielded from the effects of the corrupt information.

Once the inhibit logic 410 inhibits the control signals 420, 422, 424, it makes a determination (508) as to whether to continue inhibiting. In one embodiment, the inhibit logic 410 continues inhibiting the control signals 420, 422, 424 only so long as the potentially corrupted blocks are being read. Thus, in (508), the inhibit logic 410 determines whether all of the potentially corrupted blocks in the current set of blocks have been read. In one embodiment, this is carried out by maintaining a block count. Specifically, the inhibit logic 410 counts the number of blocks that have been read since the detection of the trigger signal 420, beginning with the first RUNOUT block RO1 206. Since there are seven link sequence blocks, and since it is the link sequence blocks that are most likely to contain corrupted information, the inhibit logic 410 continues inhibiting the control signals 420, 422, 424 until the block count reaches seven. After that, all of the link sequence blocks will have been read; as a result, the inhibit logic 410 terminates (510) the inhibiting. In one embodiment, this is done by resetting the enable/disable signal 450 to a high level. The control signals 420, 422, 424 are thus re-enabled, and normal operation is resumed. Thereafter, the inhibit logic 410 returns to (502) to monitor for another indication of potentially corrupted blocks.

As an alternative to block counting, the inhibit logic 410 may carry out (508) by monitoring for the fourth RUNIN block RI4 218. As noted previously, the blocks most likely to be corrupted are the RUNOUT block RO2 208, link block L 210, RUNIN block RI1 212, and RUNIN block RI2 214. The fourth RUNIN block RI4 218 is usually not corrupted. Thus, inhibit logic 410 may monitor for this block 218 to determine the last block in the link sequence and hence, when to stop inhibiting the control signals 420, 422, 424. This and other modifications may be made without departing from the spirit of the invention.

In addition to being sent to the inputs of AND gates 412, 414, and 416, the enable/disable signal 450 may also be sent as input to the processing mechanism 402. The processing mechanism 402 may use this signal to determine when to buffer data received from the reading mechanism 304. More specifically, when the enable/disable signal 450 is at a high state (thereby, asserting the enable signal), the processing mechanism 402 buffers incoming data. However, when the enable/disable signal 450 is at a low state (thereby, asserting the disable signal), the processing mechanism 402 does not buffer incoming data. Since the disable signal is, in one embodiment, asserted only during the reading of link sequence blocks, this leads to the non-buffering of the link sequence blocks. Because the link sequence blocks do not contain any actual data, failure to buffer them does not do any harm. Thus, the enable/disable signal 450 may be used effectively by the processing mechanism 402 to prevent buffering when buffering is not necessary.

The processing mechanism 402 may also use the enable/disable signal 450 to generate an "end of link sequence" interrupt signal. Since in one embodiment, the disable signal is deasserted after the last of the link sequence blocks has been read, the deassertion of the disable signal may be used to generate an interrupt signal which indicates the end of the link sequence. This interrupt signal may be useful for certain purposes.

The processing mechanism 402 may further comprise logic for generating interrupt signals based upon the control signals 420, 422, 424. Because the control signal 420, 422, 424 are shielded from the effects of corrupted information, the interrupt signals generated by the processing mechanism 402 based upon the control signals 420, 422, 424 are likewise shielded. Thus, it is ensured that the processing mechanism 402 will not generate false interrupts. In some embodiments, the processing mechanism 402 may not generate any interrupt signals. In such embodiments, the control signals 420, 422, 424 themselves may be used as the interrupt signals. This and other implementations are within the scope of the present invention.

At this point, it should be noted that although the invention has been described with reference to specific embodiments, it should not be construed to be so limited. Various modifications can be made by those of ordinary skill in the art with the benefit of this disclosure without departing from the spirit of the invention. For example, the invention has been described with reference to inhibiting control signals during the reading of link sequence blocks. However, it should be noted that if so desired, control signals may be inhibited during the reading of other blocks. In fact, control signals may be inhibited during the reading of any type of block in which there is a likelihood of corrupted information. This and other modifications and enhancements may be made within the spirit of the invention. Thus, the invention should not be limited by the specific embodiments used to illustrate it but only by the scope of the appended claims.

What is claimed is:

1. A fault tolerant method for processing information in a system, comprising:
   receiving an indication that one or more upcoming information sets may contain corrupted information;
   receiving said one or more upcoming information sets; and
   inhibiting one or more selected control signals during processing of the one or more upcoming information sets to prevent any corrupted information in said one or more information sets from adversely affecting operation of the system, where the one or more control signals comprises at least one of a target match signal and a target miss signal.

2. The method of claim 1, wherein said one or more control signals comprises a trigger signal.

3. The method of claim 1, wherein said one or more upcoming information sets comprises one or more link sequence blocks.

4. The method of claim 1, wherein said indication is a trigger signal.

5. A fault tolerant apparatus for processing information in a system, comprising:
   a processing mechanism for processing one or more information sets in response to one or more control signals, where the one or more control signals comprises at least one of a target match signal and a target miss signal; and
   an inhibit logic, said inhibit logic receiving an indication that one or more upcoming information sets may contain corrupted information, and in response, inhibiting said one or more control signals to prevent any corrupted information in said one or more information sets from adversely affecting operation of said processing mechanism.

6. The apparatus of claim 5, further comprising one or more generation mechanisms for processing information in said one or more upcoming information sets to generate one or more indication signals.

7. The apparatus of claim 6, wherein said inhibit logic inhibits said one or more control signals while said one or more generation mechanisms are processing information in said one or more upcoming information sets.

8. The apparatus of claim 6, further comprising:
   an inhibit mechanism, said inhibit mechanism receiving said one or more indication signals from said one or more generation mechanisms, and a disable signal from said inhibit logic, and in response to said disable signal, said inhibit mechanism inhibiting said one or more control signals.

9. The apparatus of claim 8, wherein said inhibit mechanism comprises one or more AND gates.

10. The apparatus of claim 5, wherein said one or more control signals comprises a trigger signal.

11. The apparatus of claim 10, wherein said indication received by said inhibit logic comprises said trigger signal.

12. A fault tolerant method for processing information in a system, comprising:
   receiving an indication that one or more upcoming information sets, comprising one or more link sequence blocks, may contain corrupted information;
   receiving the one or more upcoming information sets; and
   inhibiting one or more selected control signals during processing of the one or more upcoming information sets to prevent any corrupted information in the one or more information sets from adversely affecting operation of the system;
   determining whether to continue inhibiting the one or more control signals, by determining whether a selected link sequence block has been processed; and
   in response to a determination not to continue inhibiting the one or more control signals, enabling the one or more control signals to restore regular operation.

13. The method of claim 12, wherein said selected link sequence block is a last link sequence block in a link sequence.

14. A fault tolerant apparatus for processing information in a system, comprising:
   a processing mechanism for processing one or more information sets, comprising one or more link sequence blocks, in response to receipt of one or more control signals;
   an inhibit logic receives an indication that one or more upcoming information sets may contain corrupted information, and in response to receipt of the indication, (i) the inhibit logic inhibits the one or more controls signals to prevent any corrupted information in the one or more information sets from adversely affecting operation of the processing mechanism and (ii) the inhibit logic determined whether to continue inhibiting the one or more controls signals, by determining whether at least one of a selected number of link sequence blocks has been processed, and in response to a determination not to continue inhibiting the one or more controls signals, the one or more controls signals are enabled to restore regular operation.

15. The apparatus of claim 14, wherein said selected link sequence block is a last link sequence block in a link sequence.

16. The apparatus of claim 14, wherein said processing mechanism receives a disable signal from said inhibit logic, the disable signal is asserted while a link sequence is being processed, and said processing mechanism disables data buffering when the disable signal is asserted.

17. The apparatus of claim 14, wherein said processing mechanism receives a disable signal from said inhibit logic, the disable signal is asserted while a link sequence is being processed, said processing mechanism uses the disable signal to generate an end of link sequence interrupt signal.

* * * * *